US011720309B2

(12) United States Patent
Zhang et al.

(10) Patent No.: US 11,720,309 B2
(45) Date of Patent: Aug. 8, 2023

(54) FEATURE-BASED FLOW CONTROL IN REMOTE COMPUTING ENVIRONMENTS

(71) Applicant: VMware, Inc., Palo Alto, CA (US)

(72) Inventors: Hui Zhang, Beijing (CN); Weigang Huang, Beijing (CN); Kun Shi, Beijing (CN); Jinxing Hu, Beijing (CN); Hui Yuan, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/650,261

(22) Filed: Feb. 8, 2022

(65) Prior Publication Data
US 2023/0185504 A1 Jun. 15, 2023

(30) Foreign Application Priority Data
Dec. 14, 2021 (WO) ................ PCT/CN2021/137830

(51) Int. Cl.
G06F 3/12 (2006.01)
G06F 9/451 (2018.01)

(52) U.S. Cl.
CPC .......... *G06F 3/1285* (2013.01); *G06F 3/1203* (2013.01); *G06F 3/1224* (2013.01); *G06F 3/1253* (2013.01); *G06F 3/1268* (2013.01); *G06F 3/1296* (2013.01); *G06F 9/452* (2018.02)

(58) Field of Classification Search
CPC .... G06F 3/1285; G06F 3/1203; G06F 3/1224; G06F 3/1253; G06F 3/1268; G06F 3/1296; G06F 9/452
See application file for complete search history.

(56) References Cited

U.S. PATENT DOCUMENTS

| | | | | |
|---|---|---|---|---|
| 2010/0328720 A1* | 12/2010 | Suzuki | ................. | G06F 3/1204 358/1.15 |
| 2012/0050796 A1* | 3/2012 | Yokokura | ............. | G06F 3/1241 358/1.15 |
| 2012/0120438 A1* | 5/2012 | Sato | ........................ | G06F 3/124 358/1.15 |
| 2012/0162679 A1* | 6/2012 | Okajima | ................. | G06F 3/121 358/1.15 |
| 2013/0100483 A1* | 4/2013 | Henry | ................ | G06K 15/1863 358/1.15 |
| 2019/0265929 A1* | 8/2019 | Kitagata | ............... | G06F 3/1236 |

* cited by examiner

Primary Examiner — John R Wallace
(74) Attorney, Agent, or Firm — Patterson + Sheridan, LLP

(57) ABSTRACT

The disclosure provides an approach for print redirection in a remote computing environment. Embodiments include receiving, on a remote device, a request to perform a printing task using a printing device associated with a client device. Embodiments include determining, on the remote device, that data associated with the request to perform the printing task exceeds a size threshold. Embodiments include generating, on the remote device, a plurality of data slices based on the data, wherein each respective data slice of the plurality of data slices comprises a respective subset of the data that does not exceed the size threshold. Embodiments include transmitting, from the remote device to the client device, the plurality of data slices as separate transmissions in separate time intervals along with information that allows the data to be reconstructed from the plurality of data slices for performing the printing task on the client device.

20 Claims, 4 Drawing Sheets

FEATURE-BASED FLOW CONTROL IN REMOTE COMPUTING ENVIRONMENTS

CROSS-REFERENCE TO RELATED APPLICATION(S)

This application claims benefit of and priority to International Application No. PCT/CN2021/137830, filed Dec. 14, 2021, which is hereby assigned to the assignee hereof and hereby expressly incorporated by reference herein in its entirety as if fully set forth below and for all applicable purposes.

BACKGROUND

In a virtual desktop infrastructure (VDI) environment, a local client device can access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running.

In some cases, a printing device ("printer") associated with the client device may be used to print data associated with the virtual desktop or other remote application on the remote device. In certain aspects, the virtual desktop or remote application on the remote device may transmit such data to the client device for printing.

Transmitting the data to be printed from the remote device to the client device may involve a substantial amount of network traffic, and may result in latency and poor performance for other aspects of the remote computing environment, such as redirection of other, potentially higher-priority, data between the client device and the remote device. Transmitting the data promptly may serve only to congest the network and may not result in the data being printed any faster, as printers generally take a significant amount of time to process a print request and print the data. The congestion caused by transmitting potentially large amounts of data for printing from the remote device to the client device in a short amount of time may significantly reduce the ability of a virtual desktop or other remotely-located application to function as intended during this time.

Accordingly, there is a need in the art for improved techniques for print redirection between a virtual desktop or remote application on a remote device and a printer associated with a client device.

It should be noted that the information included in the Background section herein is simply meant to provide a reference for the discussion of certain embodiments in the Detailed Description. None of the information included in this Background should be considered as an admission of prior art.

SUMMARY

A method of print redirection in a remote computing environment is provided. The method includes: receiving, on a remote device that is remote from a client device, a request to perform a printing task using a printing device associated with the client device; determining, on the remote device, that data associated with the request to perform the printing task exceeds a size threshold; generating, on the remote device, a plurality of data slices based on the data, wherein each respective data slice of the plurality of data slices comprises a respective subset of the data that does not exceed the size threshold; and transmitting, from the remote device to the client device, the plurality of data slices as separate transmissions in separate time intervals along with information that allows the data to be reconstructed from the plurality of data slices for performing the printing task on the client device.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
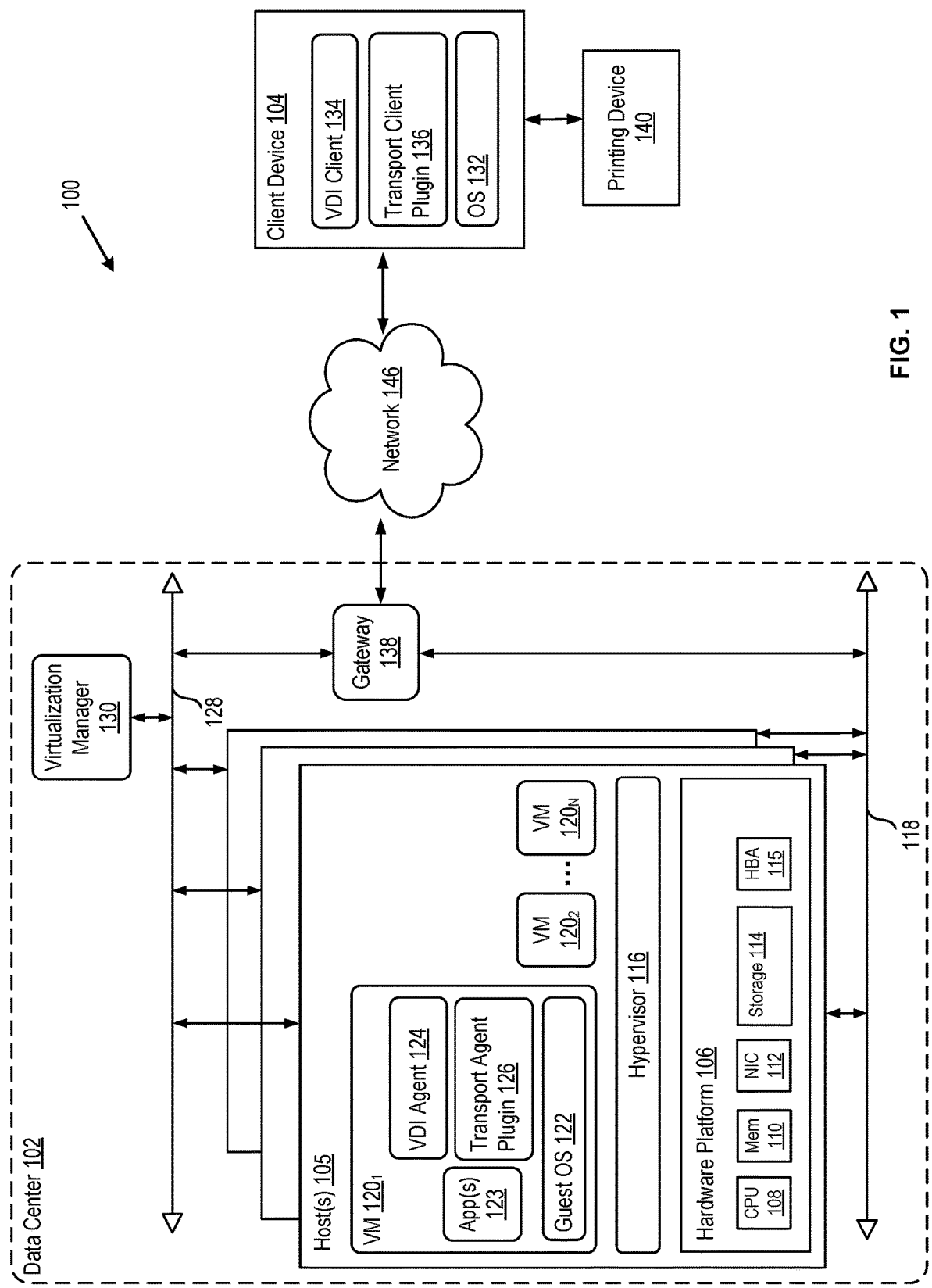
FIG. 1 depicts a block diagram of a virtualized desktop infrastructure system in which one or more embodiments according to the present disclosure may be implemented.

The present disclosure provides an approach for improved print redirection in a remote computing environment. In some cases, a printing device, which may be referred to as a printer, connected to a client device may be used by an application (e.g., virtual desktop or other application) located on a remote device to print data from the remote device. As such, data to be printed must be redirected from the remote device to the client device in order to send the requested print job to the printer. A print job generally refers to a request to print certain data. According to certain existing techniques, print redirection may be accomplished through operating system (OS) event redirection, which is described in more detail in U.S. patent application Ser. No. 16/444,840, the contents of which are incorporated by reference herein in their entirety.

However, conventional techniques for print redirection in remote computing environments may involve the transmission of a substantial amount of data over a network in a short amount of time. Print jobs tend to involve large amounts of data, such as many megabytes (MB) per page to be printed, and this data may be transmitted at a high rate, such as four MB per second. As described in more detail below with respect to FIG. 2, transmitting data for a print job at such a rate may congest or even monopolize the network connection between the remote device and the client device, thereby preventing other aspects of the remote computing environment from functioning properly. For instance, other types of data may be of a higher priority than print jobs and/or may require prompt transfer in order to provide an intended function properly, such as redirection of mouse or keyboard input from the client device to a virtual desktop on the remote machine or transmission of a virtual desktop screen from the remote device to the client device. The network congestion caused by transmitting print job data at a high rate may cause significant lag in these other aspects of the remote computing environment, thereby harming the functioning of the system with no discernible benefit (e.g., because the printer will still take a certain amount of time to process the print job and print the data, regardless of how quickly the print job data is transmitted to the client device).

As such, due to the relatively low priority and non-time-sensitive nature of print jobs, embodiments of the present disclosure allow the transmission of data related to print jobs over a network to be rate-limited in order to reduce network congestion. For instance, in order to achieve a particular transmission rate, certain embodiments include splitting data related to a print job into a plurality of slices, and transmitting these slices sequentially at fixed intervals. As described in more detail below with respect to FIG. 3, each slice may contain an amount of data that is less than or equal to a size threshold (e.g., 400 kilobytes (KB)), and one slice may be sent per time interval (e.g., one second) in order to achieve a particular transmission rate (e.g., 400 KB per second).

In some embodiments, a protocol data unit (PDU) for the print job is split into a plurality of slices that are separate PDUs. A PDU is a single unit of information transmitted among peer entities of a computer network, and generally includes a PDU header with attributes of the PDU. For example, a slice may be a PDU with a PDU header including information that allows the original full PDU of the print job to be reconstructed from the plurality of slices. In one example, the PDU header of a slice includes an identifier associated with the print job (e.g., which is common to all of the slices generated from the print job) and an ordering value that indicates what order to arrange the slices in for reconstruction of the original full PDU. For example, the ordering values of the slices may be sequential numerical values that indicate the order of the slices (e.g., 0, 1, 2, 3, etc.). In some cases, the final slice of the print job may include an ordering value that indicates that it is the final slice (e.g., a particular number or character such as "f") or a separate indicator (e.g., in addition to the ordering value) that indicates that it is the final slice. In other embodiments, the ordering value of a given slice indicates whether the given slice is the first slice, a middle slice, or the last slice of the print job (e.g., if the slices are expected to be transmitted and received in order). For instance, an ordering value of "0" may indicate a first slice, "1" may indicate a middle slice, and "2" may indicate a last slice.

When a given slice is received on the client device, the PDU header of the slice is used to determine how the given slice is to be used to reconstruct the print job. For instance, if an identifier in the PDU header of the given slice indicates that the given slice is the first slice of the print job, then a new buffer is created on the client device associated with the identifier of the print job indicated in the PDU header. Subsequently-received slices having the same identifier and values indicating that the slices are middle slices of the print job are added to the buffer associated with the identifier. When a slice having the identifier is received with a value indicating that the slice is the final slice of the print job, the slice is added to the end of the buffer, and a complete PDU for the print job is constructed on the client device from the buffer. The complete PDU is then passed on (e.g., to an event handler on the client device) to be processed by the printer.

In some cases, the transmission rate limit for print jobs is set (e.g., by a network administrator) via a user interface or through interaction with application programming interface (API). For instance, an administrator may set transmission rate limits for various types of features (e.g., print jobs, storage I/O operations, mouse/keyboard redirection, touch input redirection, virtual desktop screen redirection, and/or the like), and the rate limits may be enforced using techniques described herein. It is noted that while certain embodiments are described with respect to print redirection, techniques described herein for rate-limiting print redirection may also be used to rate-limit other types of data that may be transmitted over a network, such as in a VDI environment.

Techniques for print redirection in remote computing environments described herein improve upon conventional techniques for print redirection by avoiding the unnecessary network congestion caused by transmitting large amounts of data associated with print jobs at a high rate over a network. Embodiments of the present disclosure allow transmission of data related to print jobs to be rate-limited in order to keep network resources consistently available for other types of data transmission that may have a higher priority and/or that may be more time-sensitive. For example, by preventing a network connection from becoming temporarily monopolized by the transmission of large amounts of print job data at a high rate, embodiments of the present disclosure allow time-sensitive features such as user input redirection and virtual desktop screen redirection to continue to function properly while print job data is transmitted over the network.

FIG. 1 depicts a block diagram of a virtualized desktop infrastructure (VDI) system 100 in which one or more embodiments according to the present disclosure may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134, OS 132, and transport client plugin 136. In certain embodiments, VDI client 134 and transport client plugin 136 run on top of OS 132. OS 132 may be a standard, commodity operating system.

VDI client 134 is a user-side interface of a virtualized desktop running on one of virtual machines (VMs) 120. Though certain aspects are described herein with respect to a virtual desktop running on a VM, the techniques may similarly be used for a virtual desktop or application running on other types of VCIs, such as containers, or on physical computing devices. As used herein, a "virtualized desktop" or "remote desktop" is a desktop running on, for example, one of VMs 120 that is displayed remotely on client device 104, as though the remote desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 using a desktop delivery protocol such as VMware® Blast™, or Microsoft® Remote Desktop Protocol (RDP)™.

After transmission, the frames are displayed on client device 104 for interaction by the user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

As the user interacts with the virtual desktop, such as using a mouse and keyboard and/or other peripheral devices, the user input events may be redirected by VDI client 134 to VDI agent 124. A printing device 140 is connected to client device 104, and may be used to print data from VM 120, such as by the virtual desktop and/or one or more applications 123.

Transport client plugin 136 generally comprises an application that performs operations related to transmission and reception of PDUs, such as for print jobs, user input redirection, and other types of event redirection between client device 104 and VMs 120. For example, a virtual channel may be established between transport client plugin 136 and transport agent plugin 126 on VM 120. A virtual channel is a logical communication resource between two endpoints that is allocated particular communication resources from one or more physical network interfaces associated with the two endpoints, and allows for communication between the two endpoints. In one embodiment, transport client plugin 136 is a plugin installed in client device 104, such as within VDI client 134 or is a separate application from VDI client 134.

It is noted that while transport client plugin 136 is depicted separately from VDI client 134, transport client plugin 136 may alternatively be included within VDI client 134. Furthermore, while not shown, client device 104 may further comprise a bridge component that acts as an intermediary between transport agent plugin 126 and transport client plugin 136.

Data center 102 includes host(s) 105, a virtualization manager 130, a gateway 138, a management network 128, and a data network 118. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs 120$_1$ to 120$_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. One example of a hypervisor 116 that may be used is a VMware ESXi™ hypervisor provided as part of the VMware vSphere® solution made commercially available from VMware, Inc. of Palo Alto, Calif.

Each VM 120 includes a guest OS 122, one or more applications 123, a VDI agent 124, and transport agent plugin 126. Application(s) 123, VDI agent 124, and block device agent 126 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

Transport agent plugin 126 interacts with transport client plugin 136 for print redirection as described herein, such as via a virtual channel over network 146. In one embodiment, transport agent plugin 126 is a plugin installed in VM 120$_1$, such as within VDI agent 124, or is a separate application from VDI agent 124. In one embodiment, transport agent plugin 126 communicates with a bridge component (not shown), which in turn communicates with transport client plugin 136 on client device 104.

According to an example, a request to perform a print job is initiated on VM 120$_1$, such as by an application 123, directed to printing device 140 of client device 104. Transport agent plugin 126 receives the request, and determines whether data related to the print job needs to be divided into slices before transmission to client device 104. In some embodiments, transport agent plugin 126 compares a size of the data (e.g., a PDU for the print job) to a size threshold. The size threshold may have been determined based on input from a user, such as via virtualization manager 130 or another component that allows an administrator to set parameters related to the remote computing environment. In one example, an administrator provided a transmission rate limit for print jobs via interaction with a user interface, and the size threshold is determined based on the transmission rate limit.

If the size of the data exceeds the threshold, transport agent plugin 126 generates a plurality of slices based on the data, each slice being less than or equal to the size threshold. The slices may be individual PDUs with PDU headers that allow the original data (e.g., a full PDU for the print job) to be reconstructed from the plurality of slices. For instance, the PDU headers may include an identifier that is uniquely associated with the print job and an ordering value indicating whether a given slice is the first slice, a middle slice, or the last slice of the print job (or an ordering value that simply indicates the numerical order of the slices and, in some embodiments, whether the slice is the last slice). Transport agent plugin 126 may transmit the plurality of slices over a series of consecutive time intervals, such as by sending one slice per time interval, to transport client plugin 136 in order to achieve a transmission rate that is consistent with the transmission rate limit for print jobs. Transport client plugin 136 may receive the slices, reconstruct the original data (e.g., the full PDU for the print job), and pass the print job on to one or more additional components (e.g., an event handler for print jobs) for processing by printing device 140. Subsequently, printing device 140 may print the data.

It is noted that while transport agent plugin 126 is depicted separately from VDI agent 124, transport agent plugin 126 may alternatively be included within VDI agent 124.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 138 provides VMs 120 and other components in data center 102 with connectivity to network 146. Gateway 138 may manage external public IP addresses for VMs 120, route traffic incoming to and outgoing from data center 102, and provide networking services, such as firewalls, network address translation (NAT), dynamic host configuration protocol (DHCP), and load balancing. Gateway 138 uses data network 118 to transmit data network packets to hosts 105. Gateway 138 may be a virtual computing instance, a physical device, or a software module running within host 105. Gateway 138 may include two gateways: a management gateway for management network 128 and a data gateway for data network 118.

Figure 2:
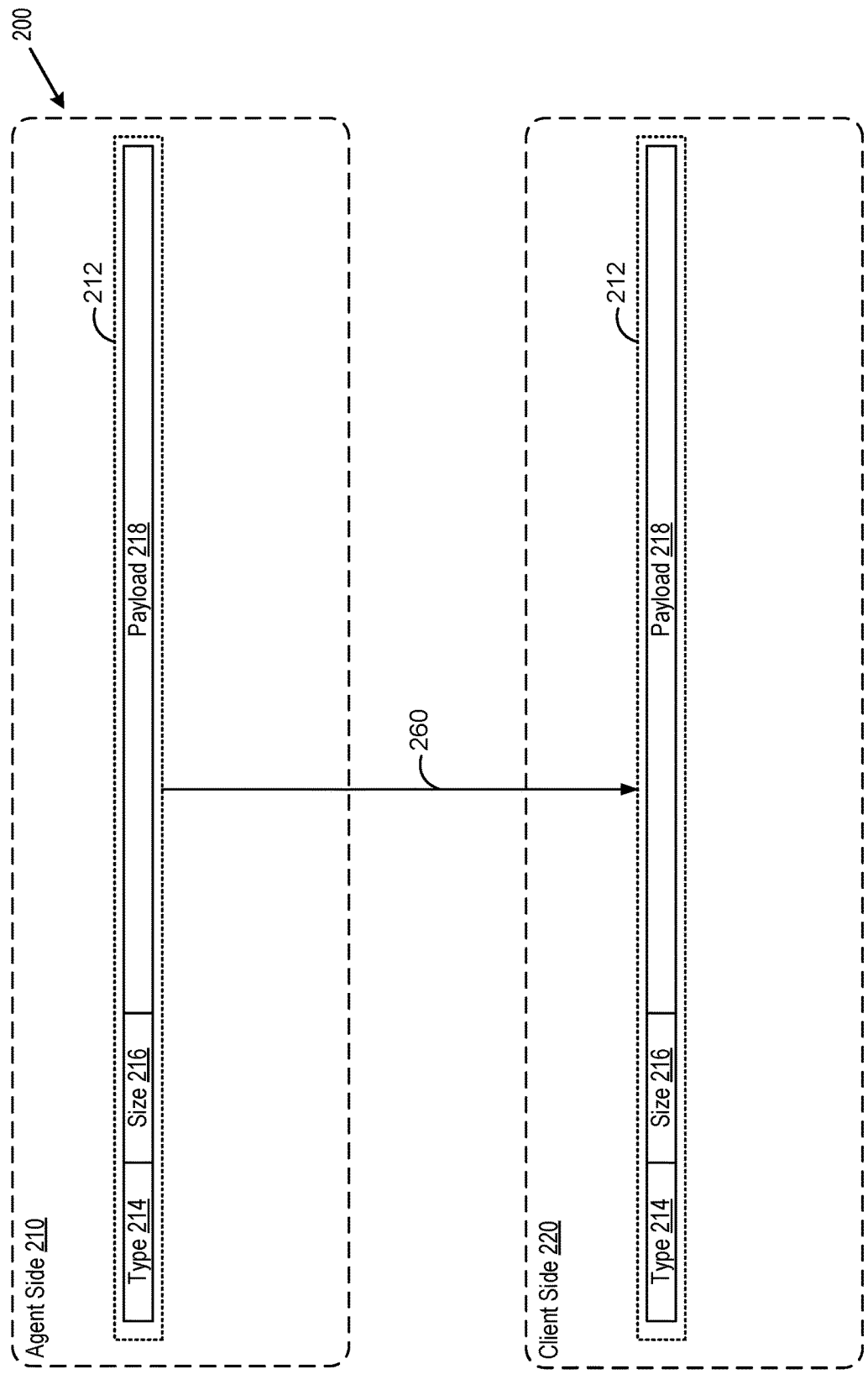
FIG. 2 is an illustration of a prior art technique for print redirection in a remote computing environment.

FIG. 2 is an illustration 200 of a prior art technique for print redirection in a remote computing environment. Illustration 200 includes an agent side 210, which may be representative of a remote device such as a host 105 or VM 120 of FIG. 1, and a client side 220, which may be representative of a client device similar to client device 104 of FIG. 1.

In illustration 200, a PDU 212 for a print job is sent via transmission 260 from agent side 210 to client side 220. PDU 212 may be generated based on a request from an application on agent side 210 to print data from agent side 210 on a printer associated with client side 220. PDU 212 includes a header indicting a type 214 and size 216 of the PDU and a payload 218 that includes data to be printed. Type 214 may indicate that the PDU is for a print job, as opposed to PDUs for different types of features, such as for I/O operations. Size 216 indicates a size of the print job, such as an amount of data to be printed (e.g., a size of payload 218).

By transmitting PDU 212 in its entirety from agent side 210 to client side 220 (e.g., in a single transmission or at least at a high transmission rate), the prior art technique depicted in illustration 200 may result in undue network congestion. Print jobs generally have a lower priority than other types of data transmissions, such as user input redirection, and are generally not time-sensitive. A user does not expect a print job to begin immediately upon request, and printers generally take a certain amount of time to process the job and begin printing. Thus, causing network congestion by rapidly transmitting PDU 212 from agent side 210 to client side 220 is unnecessary and may potentially interfere with the functioning of higher-priority functionality.

As such, embodiments of the present disclosure involve rate limiting print redirection, as described in more detail below with respect to FIG. 3.

Figure 3:
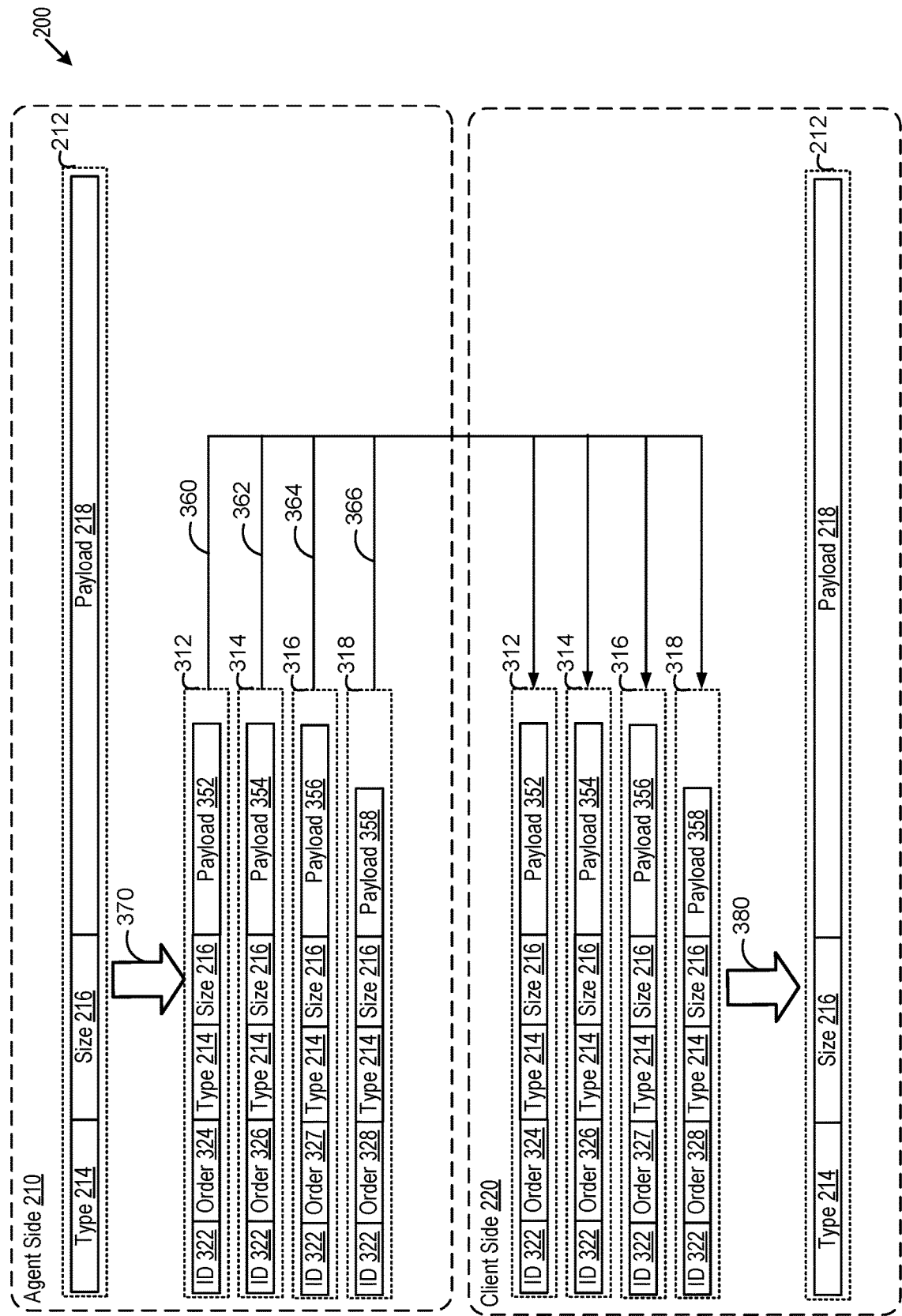
FIG. 3 is an illustration of an improved technique for print redirection in a remote computing environment, according to embodiments of the present disclosure.

FIG. 3 is an illustration 300 of an improved technique for print redirection in a remote computing environment, according to embodiments of the present disclosure. The issues described above with respect to FIG. 2 are addressed by techniques described herein, such as with respect to FIG. 3.

Illustration 300 includes agent side 210, client side 220, and PDU 212 of FIG. 2. However, rather than redirecting a print job in a single transmission and/or at a high transmission rate, as in FIG. 2, illustration 300 depicts redirecting print jobs via a plurality of smaller slices that are sent in separate time intervals in order to implement a transmission rate limit.

On agent side 210, PDU 212 is divided at step 370 into a plurality of smaller PDUs 312, 314, 316, and 318, which are examples of slices or data slices. For instance, payload 218 may be compared to a size threshold and, upon determining that payload 218 exceeds the size threshold, payload 218 may be broken into smaller payloads 352, 354, 356, and 358. Payloads 352, 354, and 356 may all be equal to the size threshold while payload 358 may be smaller than the size threshold. For example, if payload 218 is 1500 KB (1.5 MB) and the size threshold is 400 KB (e.g., based on a transmission rate limit of 400 KB per second), then payloads 352, 354, and 356 may each be 400 KB, while payload 358 may be 300 KB (e.g., because only 300 KB remain in the 1500 KB payload 218 after the other three 400 KB slices). In some embodiments, payloads 352, 354, 356, and 358 may have the same or different sizes all less than or equal to the threshold.

In addition to the type 214 and size 216 from PDU 212, the header of each of PDUs 312, 314, 316, and 318 further includes an ID 322 and an ordering value 324, 326, 327, or 328. ID 322 is an identifier that is unique to the print job and is common to all of PDUs 312, 314, 316, and 318. Ordering values 324, 326, 327, and 328 each indicate whether a given PDU is a first slice, middle slice, or last slice. For instance, ordering value 324 indicates that PDU 312 is a first slice, ordering values 326 and 327 indicate that PDUs 314 and 316 are middle slices, and ordering value 328 indicates that PDU 318 is a last slice.

PDUs 312, 314, 316, and 318 are transmitted from agent side 210 to client side 220 as transmissions 360, 362, 364, and 366, each of which is sent in a separate time interval. For example, the time interval may be one second, and PDUs 312, 314, 316, and 318 may be sent in a series of consecutive one second intervals in order to comply with a transmission rate limit of 400 KB per second.

PDUs for other print jobs, as well as other types of data, may be transmitted in the same time intervals as transmissions 360, 362, 364, and 366. Thus, the PDU headers may be needed to determine which print job each PDU belongs to and to determine an order in which the PDUs should be used to reconstruct a print job.

On client side 220, at step 380, PDU 212 is reconstructed from PDUs 312, 314, 316, and 318. In an example, when a transport client plugin on client side 220 receives PDU 312, it determines based on ordering value 324 that PDU 312 is the first slice for ID 322. As such, the transport client plugin creates a new buffer for ID 322 and places PDU 312 in the buffer. Next, upon receiving PDUs 314 and 316, the transport client plugin determines based on ordering values 326 and 327 that PDUs 314 and 316 are middle slices for ID 322. Accordingly, the transport client plugin adds PDUs 314 and 316, in the order they are received, to the buffer for ID 322. Finally, upon receiving PDU 318, the transport client plugin determines based on ordering value 328 that PDU 318 is the last slice for ID 322. As such, the transport client plugin adds PDU 318 to the end of the buffer for ID 322. In alternative embodiments, ordering values 324, 326, 327, and 328 are sequential numerical values (e.g., 0, 1, 2, 3), and PDUs 312, 314, 316, and 318 are added to the buffer in the order of the numerical values. In some embodiments, ordering value 328 may indicate that PDU 318 is the last slice (e.g., by the use of a particular value and/or a separate indicator).

The transport client plugin then reconstructs PDU 212 based on the buffer for ID 322. For example, the transport client plugin may reconstruct payload 218 by combining payloads 352, 354, 356, and 358 in the order in which the PDUs were added to the buffer, and may reconstruct the header of PDU 212 based on the type 214 and size 216 included in all of PDUs 312, 314, 316, and 318.

Subsequently, PDU 212 may be further processed, such as by an event handler, on client side 220 and the print job is printed by the printer on client side 220.

Figure 4:
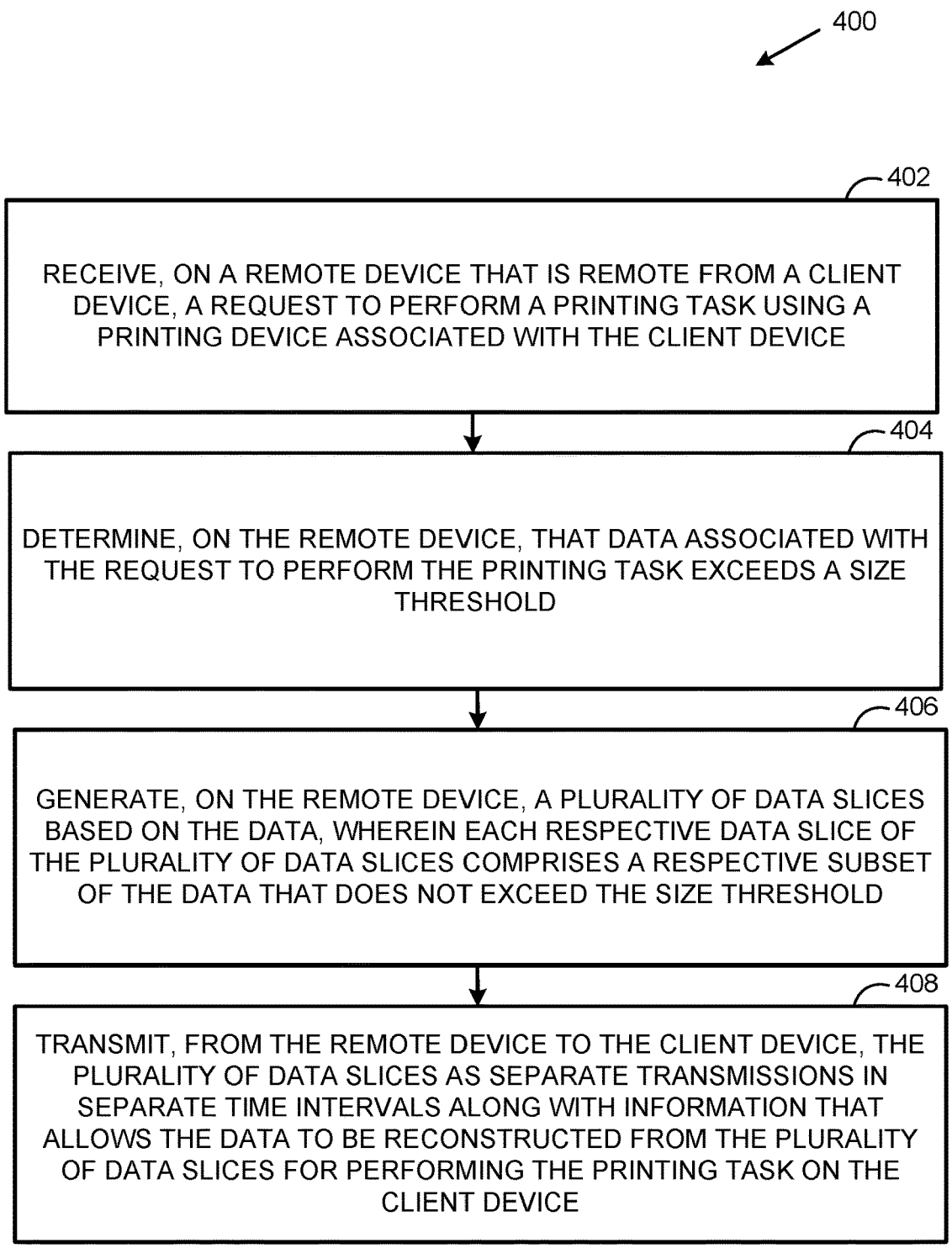
FIG. 4 depicts example operations related to print redirection in a remote computing environment.

FIG. 4 illustrates example operations 400 related to print redirection in a remote computing environment. For example, operations 400 may be performed by one or more components of client device 104 and/or host 105 of FIG. 1.

Operations 400 begin at step 402, with receiving, on a remote device that is remote from a client device, a request to perform a printing task using a printing device associated with the client device.

Operations 400 continue at step 404, with determining, on the remote device, that data associated with the request to perform the printing task exceeds a size threshold. In some embodiments, the size threshold is determined based on input received via a user interface, such as defining a transmission rate limit for print redirections.

Operations 400 continue at step 406, with generating, on the remote device, a plurality of data slices based on the data, wherein each respective data slice of the plurality of data slices comprises a respective subset of the data that does not exceed the size threshold. The plurality of data slices may, for example, comprise a plurality of protocol data units (PDUs) (e.g., generated by the VDI agent or a component associated with the VDI agent).

Operations 400 continue at step 408, with transmitting, from the remote device to the client device, the plurality of data slices as separate transmissions in separate time intervals along with information that allows the data to be reconstructed from the plurality of data slices for performing the printing task on the client device.

In some embodiments, the information that allows the data to be reconstructed from the plurality of data slices for printing on the client device comprises ordering values indicating an order of the plurality of slices (e.g., sequential numerical values or, for each respective data slice of the plurality of data slices, a value indicating whether the respective data slice is a first data slice, a middle data slice, or a last data slice), and an identifier that is common to the plurality of data slices.

In some cases, the remote device comprises a virtual desktop infrastructure (VDI) agent, the client device comprises a VDI client (e.g., that accesses a virtual desktop via the VDI agent), and the request to perform the printing task is generated by a virtual desktop associated with the VDI agent.

In certain embodiments, the plurality of data slices are transmitted from the remote device to the client device via a virtual channel. In some cases, a length of each of the separate time intervals is determined based on a size of a respective data slice of the plurality of data slices. For example, according to certain embodiments of the present disclosure, only one of the plurality of data slices may be transmitted during each respective time interval of the separate time intervals.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) -CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of print redirection in a remote computing environment, the method comprising:
   receiving, on a remote device that is remote from a client device, a request to perform a printing task using a printing device associated with the client device;
   determining, on the remote device, that data associated with the request to perform the printing task exceeds a size threshold, wherein the size threshold is determined based on a configured transmission rate limit for printing tasks;
   generating, on the remote device, a plurality of data slices based on the data, wherein each respective data slice of the plurality of data slices comprises a respective subset of the data that does not exceed the size threshold; and
   transmitting, from the remote device to the client device, the plurality of data slices as separate transmissions in separate consecutive time intervals along with information that allows the data to be reconstructed from the plurality of data slices for performing the printing task on the client device, wherein each of the separate consecutive time intervals has a length that is based on the configured transmission rate limit for printing tasks.

2. The method of claim 1, wherein the information that allows the data to be reconstructed from the plurality of data slices for printing on the client device comprises:

ordering values indicating an order of the plurality of slices; and an identifier that is common to the plurality of data slices.

3. The method of claim 1, further comprising determining the size threshold based on input received via a user interface.

4. The method of claim 1, wherein:
the remote device comprises a virtual desktop infrastructure (VDI) agent;
the client device comprises a VDI client; and
the request to perform the printing task is generated by a virtual desktop associated with the VDI agent.

5. The method of claim 4, wherein the plurality of data slices comprise a plurality of protocol data units (PDUs) generated by the VDI agent or a component associated with the VDI agent, and wherein the plurality of data slices are transmitted from the remote device to the client device via a virtual channel.

6. The method of claim 1, wherein the length of each of the separate consecutive time intervals is determined based further on a size of a respective data slice of the plurality of data slices.

7. The method of claim 1, wherein only one of the plurality of data slices is transmitted during each respective time interval of the separate consecutive time intervals.

8. A system for print redirection in a remote computing environment, the system comprising:
at least one memory; and
at least one processor coupled to the at least one memory, the at least one processor and the at least one memory configured to:
receive, on a remote device that is remote from a client device, a request to perform a printing task using a printing device associated with the client device;
determine, on the remote device, that data associated with the request to perform the printing task exceeds a size threshold, wherein the size threshold is determined based on a configured transmission rate limit for printing tasks;
generate, on the remote device, a plurality of data slices based on the data, wherein each respective data slice of the plurality of data slices comprises a respective subset of the data that does not exceed the size threshold; and
transmit, from the remote device to the client device, the plurality of data slices as separate transmissions in separate consecutive time intervals along with information that allows the data to be reconstructed from the plurality of data slices for performing the printing task on the client device, wherein each of the separate consecutive time intervals has a length that is based on the configured transmission rate limit for printing tasks.

9. The system of claim 8, wherein the information that allows the data to be reconstructed from the plurality of data slices for printing on the client device comprises:
ordering values indicating an order of the plurality of slices; and
an identifier that is common to the plurality of data slices.

10. The system of claim 8, wherein the at least one processor and the at least one memory are further configured to determine the size threshold based on input received via a user interface.

11. The system of claim 8, wherein:
the remote device comprises a virtual desktop infrastructure (VDI) agent;
the client device comprises a VDI client; and
the request to perform the printing task is generated by a virtual desktop associated with the VDI agent.

12. The system of claim 11, wherein the plurality of data slices comprise a plurality of protocol data units (PDUs) generated by the VDI agent or a component associated with the VDI agent, and wherein the plurality of data slices are transmitted from the remote device to the client device via a virtual channel.

13. The system of claim 8, wherein the length of each of the separate consecutive time intervals is determined based further on a size of a respective data slice of the plurality of data slices.

14. The system of claim 8, wherein only one of the plurality of data slices is transmitted during each respective time interval of the separate consecutive time intervals.

15. A non-transitory computer-readable medium storing instructions that, when executed by one or more processors, cause the one or more processors to:
receive, on a remote device that is remote from a client device, a request to perform a printing task using a printing device associated with the client device;
determine, on the remote device, that data associated with the request to perform the printing task exceeds a size threshold, wherein the size threshold is determined based on a configured transmission rate limit for printing tasks;
generate, on the remote device, a plurality of data slices based on the data, wherein each respective data slice of the plurality of data slices comprises a respective subset of the data that does not exceed the size threshold; and
transmit, from the remote device to the client device, the plurality of data slices as separate transmissions in separate consecutive time intervals along with information that allows the data to be reconstructed from the plurality of data slices for performing the printing task on the client device, wherein each of the separate consecutive time intervals has a length that is based on the configured transmission rate limit for printing tasks.

16. The non-transitory computer-readable medium of claim 15, wherein the information that allows the data to be reconstructed from the plurality of data slices for printing on the client device comprises:
ordering values indicating an order of the plurality of slices; and
an identifier that is common to the plurality of data slices.

17. The non-transitory computer-readable medium of claim 15, wherein the instructions, when executed by the one or more processors, further cause the one or more processors to determine the size threshold based on input received via a user interface.

18. The non-transitory computer-readable medium of claim 15, wherein:
the remote device comprises a virtual desktop infrastructure (VDI) agent;
the client device comprises a VDI client; and
the request to perform the printing task is generated by a virtual desktop associated with the VDI agent.

19. The non-transitory computer-readable medium of claim 18, wherein the plurality of data slices comprise a plurality of protocol data units (PDUs) generated by the VDI agent or a component associated with the VDI agent, and wherein the plurality of data slices are transmitted from the remote device to the client device via a virtual channel.

20. The non-transitory computer-readable medium of claim 15, wherein the length of each of the separate consecutive time intervals is determined based further on a size of a respective data slice of the plurality of data slices.

* * * * *